US012717101B2

(12) United States Patent
Chen et al.

(10) Patent No.: US 12,717,101 B2
(45) Date of Patent: Aug. 25, 2026

(54) SNOUT ASSEMBLY

(71) Applicant: Lumentum Operations LLC, San Jose, CA (US)

(72) Inventors: Yusheng Chen, San Jose, CA (US); Jack Xu, San Jose, CA (US); Nicolas Malonzo, San Jose, CA (US); Jihua Du, San Jose, CA (US); Prasad Yalamanchili, San Jose, CA (US); Jaspreet Singh, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 334 days.

(21) Appl. No.: 18/622,701

(22) Filed: Mar. 29, 2024

(65) Prior Publication Data

US 2025/0164722 A1 May 22, 2025

Related U.S. Application Data

(60) Provisional application No. 63/600,963, filed on Nov. 20, 2023.

(51) Int. Cl.
*H04B 10/00* (2013.01)
*G02B 6/38* (2006.01)
*G02B 6/42* (2006.01)

(52) U.S. Cl.
CPC ......... *G02B 6/4292* (2013.01); *G02B 6/3869* (2013.01)

(58) Field of Classification Search
CPC .. G02B 6/4292; G02B 6/3869; G02B 6/4296; H01S 3/0401; H01S 3/02; H01S 3/0405
See application file for complete search history.

(56) References Cited

U.S. PATENT DOCUMENTS

| | | | | |
|---|---|---|---|---|
| 4,119,363 | A * | 10/1978 | Camlibel | G02B 6/4238 385/91 |
| 7,103,257 | B2 * | 9/2006 | Donaldson | G02B 6/4248 385/138 |
| 7,515,807 | B2 * | 4/2009 | Rosiewicz | G02B 6/4248 385/74 |
| 7,918,612 | B1 * | 4/2011 | Zhao | G02B 6/2553 385/95 |
| 10,754,101 | B1 * | 8/2020 | Chan | G02B 6/3825 |
| 2002/0122653 | A1 * | 9/2002 | Donaldson | G02B 6/4248 385/139 |
| 2009/0251697 | A1 * | 10/2009 | Cutillas | H01S 5/024 385/94 |
| 2015/0219853 | A1 * | 8/2015 | Kumar | G02B 6/305 385/14 |
| 2015/0369991 | A1 * | 12/2015 | Bauco | G02B 6/4204 362/555 |
| 2016/0159273 | A1 * | 6/2016 | Nakazato | F21S 41/16 315/79 |
| 2016/0327757 | A1 * | 11/2016 | Lee | G02B 6/3869 |

(Continued)

*Primary Examiner* — Agustin Bello

(57) ABSTRACT

A snout assembly of a laser pump module may include a snout bulkhead comprising an opening along a longitudinal axis of the snout bulkhead. The snout assembly may include a ferrule in the opening of the snout bulkhead. The snout assembly may include a metallization layer on a portion of an outer surface of the ferrule. The snout assembly may include a copper-silver (CuAg) solder material between the metallization layer and a surface of the opening. The CuAg solder material may bond the ferrule and the snout bulkhead.

20 Claims, 5 Drawing Sheets

(56) References Cited

U.S. PATENT DOCUMENTS

2022/0269014 A1* 8/2022 Holmquist ........... G02B 6/3843
2023/0368945 A1* 11/2023 Huang ............... H01R 13/6691
2024/0126029 A1* 4/2024 Blanc ................... G02B 6/4292
2025/0164722 A1* 5/2025 Chen .................... G02B 6/3869

* cited by examiner

SNOUT ASSEMBLY

CROSS-REFERENCE TO RELATED APPLICATION

This Patent Applications claims priority to U.S. Provisional Patent Application No. 63/600,963, filed on Nov. 20, 2023, and entitled "SNOUT ASSEMBLY." The disclosure of the prior Application is considered part of and is incorporated by reference into this Patent Application.

TECHNICAL FIELD

The present disclosure relates generally to a laser pump module and to a snout assembly for a high-power laser pump module.

BACKGROUND

A snout assembly of a laser pump module comprises mechanical components that fix an optical fiber to a housing of the laser pump module and provide dissipation of heat from the optical fiber to the housing of the laser pump. A hermeticity design for a laser pump module can be used to, for example, protect optical components and laser diodes of the laser pump module from conditions in a working environment of the laser pump module in order to improve performance and reliability of the laser pump module.

SUMMARY

In some implementations, a snout assembly of a laser pump module includes a snout bulkhead comprising an opening along a longitudinal axis of the snout bulkhead; a ferrule in the opening of the snout bulkhead; a metallization layer on a portion of an outer surface of the ferrule; and a copper-silver (CuAg) solder material between the metallization layer and a surface of the opening, wherein the CuAg solder material bonds the ferrule and the snout bulkhead.

In some implementations, a snout assembly includes a snout bulkhead comprising an opening along a longitudinal axis of the snout bulkhead, wherein the opening in the snout bulkhead comprises a first region and a second region; a ferrule in the opening of the snout bulkhead, wherein the ferrule spans a portion of the first region and a portion of the second region; a metallization layer on a portion of an outer surface of the ferrule; and a CuAg solder material between the metallization layer and a surface of the opening, wherein the CuAg solder material provides a hermetic seal between the snout bulkhead and the ferrule.

In some implementations, a snout assembly of a laser pump module includes a snout bulkhead comprising an opening; a ferrule in the opening of the snout bulkhead; a metallization layer on an outer surface of the ferrule; and a CuAg solder material that bonds the ferrule and the snout bulkhead, wherein a coefficient of thermal expansion (CTE) of the metallization layer transitions from a lower CTE nearer to the ferrule to a higher CTE nearer to the CuAg solder material.

DETAILED DESCRIPTION

The following detailed description of example implementations refers to the accompanying drawings. The same reference numbers in different drawings may identify the same or similar elements.

Figure 1:
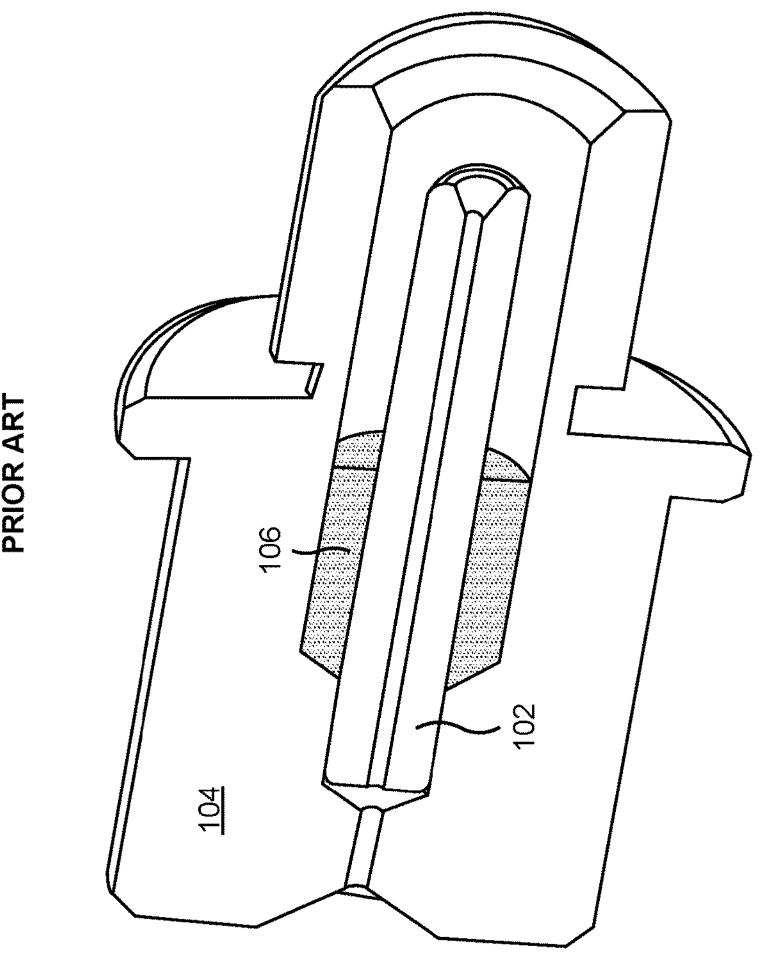
FIG. 1 is a diagram of an example of a conventional snout assembly of a laser pump module.

A conventional snout assembly of a laser pump module includes a snout bulkhead to mount an optical fiber (e.g., an optical fiber that is to transmit a laser beam) within the laser pump module and a ferrule to protect the optical fiber from bonding with the snout bulkhead. If hermeticity is desired, the conventional snout assembly may further comprise a glass solder material that bonds the ferrule and the snout bulkhead together. The purpose of the solder material is to provide hermeticity and thermal conduction (e.g., to enable dissipation of heat from cladding light of the optical fiber). FIG. 1 is a diagram of an example of a conventional snout assembly 100. As shown in FIG. 1, a ferrule 102 is arranged within an opening of a snout bulkhead 104. Here, an optical fiber (not shown) is provided along a length of the conventional snout assembly 100 through an opening that runs along a length of the ferrule 102. As further shown, a glass solder material 106 is provided so as to bond the ferrule 102 with the snout bulkhead 104 in order to provide hermeticity and thermal conduction.

In operation of a laser pump module comprising the conventional snout assembly, a laser beam is transmitted inside the optical fiber and some amount of laser light leaks from a core of the optical fiber into a cladding of the optical fiber. In the case of a high-power (e.g., greater than 2.5 kilowatts (kW)) laser pump module comprising the conventional snout assembly, heat generated by the cladding light is problematic, particularly when the laser pump module is operating in an environment with a wide temperature variation, such as outer space. Without adequate heat dissipation, the cladding light can lead to overheating and burning of the optical fiber.

The conventional technique to hermetically bond the ferrule and the snout bulkhead together using a glass solder material is inadequate for a high-power laser pump module operating in such an environment. A glass solder material (e.g., the glass solder material 106 in the conventional snout assembly 100) has relatively poor heat conduction. Therefore, in an environment in which drastic temperature changes can occur (e.g., outer space), the glass solder material does not provide adequate heat dissipation for a high-power laser and optical fiber burn can easily occur. What is needed for operation of a high-power laser module in an environment with high temperatures and high temperature variation is a snout assembly that provides improved heat dissipation without degrading hermetic quality.

Some implementations described herein provide an improved snout assembly for a laser pump module. In some implementations, the improved snout assembly includes a snout bulkhead comprising an opening along a longitudinal axis, a ferrule in the opening of the snout bulkhead, a metallization layer on a portion of an outer surface of the ferrule, and a CuAg solder material between the metallization layer and a surface of the opening. Here, the CuAg solder material bonds the ferrule (e.g., the metallization layer on the ferrule) and the snout bulkhead (e.g., so as to provide a hermetic seal). In some implementations, the improved snout assembly described herein enables improved reliability of a high-power laser pump module operating in an environment a significant temperature-variation (e.g., outer space) by preventing fiber burn caused by cladding light. More particularly, the CuAg solder material of the improved snout assembly described herein provides improved heat dissipation (e.g., as compared to the glass solder material), thereby preventing fiber burn while also providing a hermetic seal.

Figure 2A:
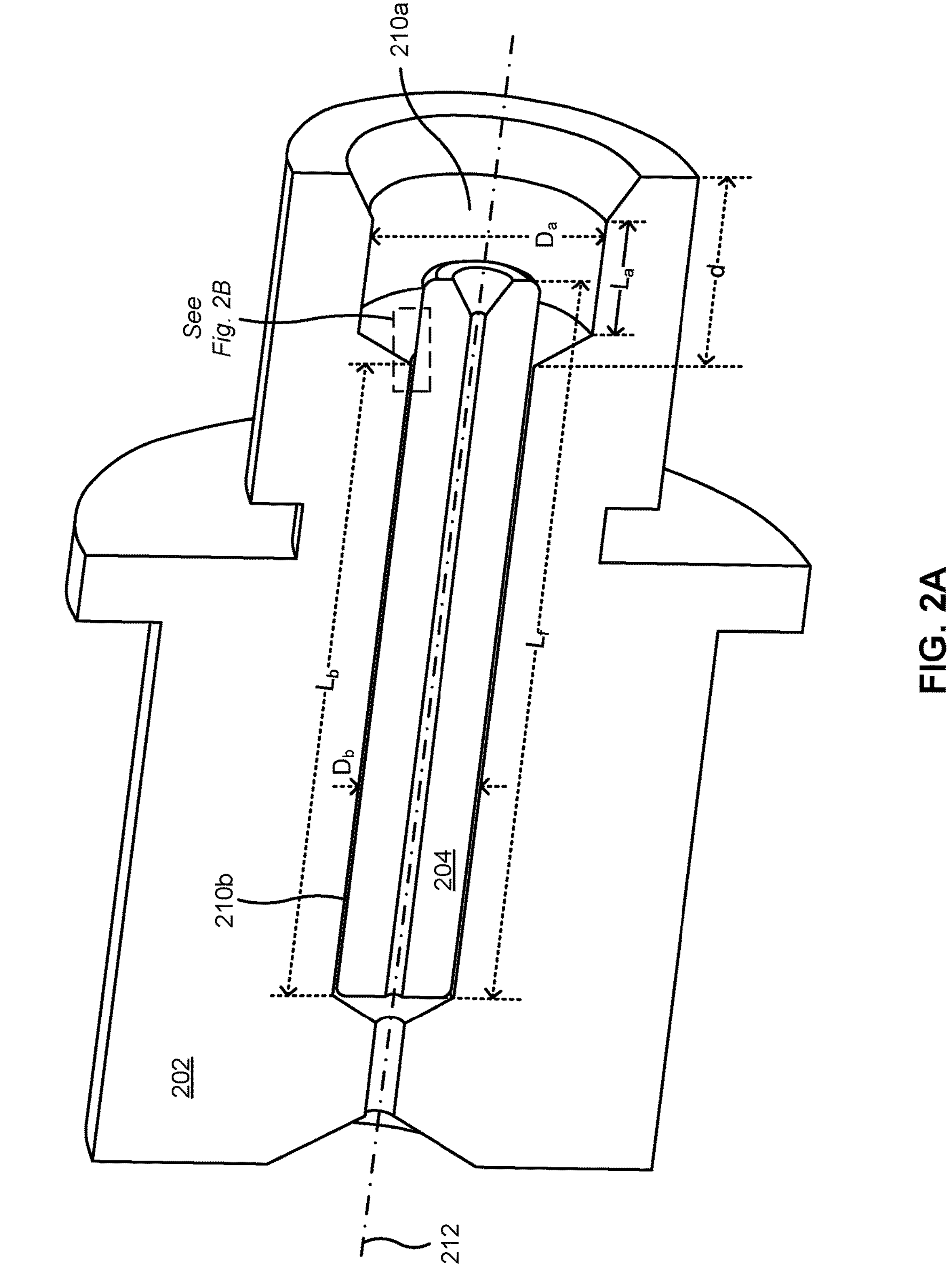
FIGS. 2A-2D are diagrams associated with an example of an improved snout assembly of a laser pump module as described herein.
Figure 2B:
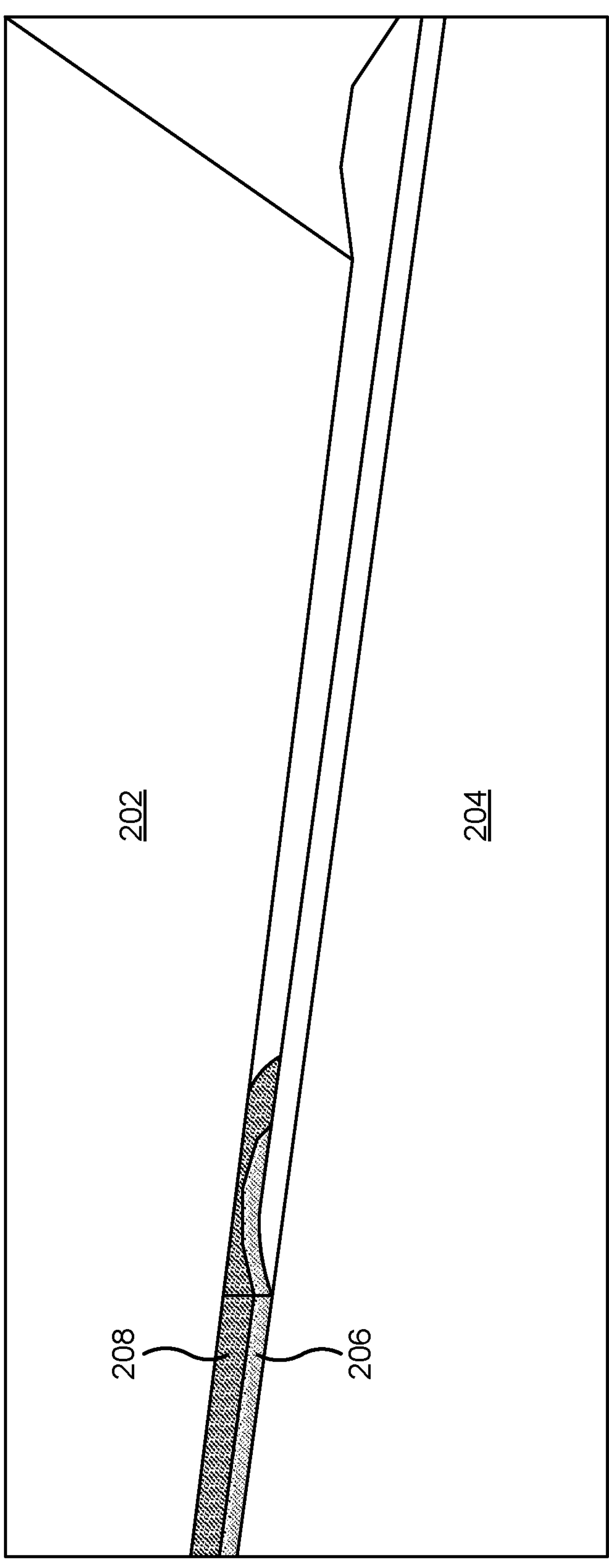

FIGS. 2A-2D are diagrams associated with an example implementation of an improved snout assembly 200 described herein. As shown in FIGS. 2A and 2B, the snout assembly 200 comprises a snout bulkhead 202, a ferrule 204, a metallization layer 206, and a CuAg solder material 208. In some implementations, the snout assembly 200 may be included in a laser pump module that is to operate in an environment with a wide temperature variation, such as outer space.

The snout bulkhead 202 is a component to mount an optical fiber (not shown) within the snout assembly 200. In some implementations, the snout bulkhead 202 may comprise a metallic material, such as steel. In some implementations, as shown, the snout bulkhead comprises an opening 210 along a longitudinal axis 212 of the snout bulkhead 202. In some implementations, that opening 210 may have multiple regions, each of a different size (e.g., diameter). For example, in the snout assembly 200, the opening 210 comprises a first region 210*a* and a second region 210*b*, with a size (e.g., diameter) $D_a$ of the first region 210*a* being larger than a size $D_b$ of the second region 210*b*. In some implementations, the opening 210 comprises one or more tapered regions that provide transitions in size between regions of the opening 210 having different sizes. For example, as shown in the snout assembly 200, the opening 210 may comprise a tapered region between the first region 210*a* and the second region 210*b* to provide a transition from the size $D_a$ of the first region 210*a* to the diameter $D_b$ of the second region 210*b*. In some implementations, a length $L_b$ of the second region 210*b* is longer than a length La of the first region 210*a*. For example, the length $L_b$ of the second region 210*b* may in some implementations be at least two times larger than the length La of the first region 210*a*. In some implementations, a distance d from an output end of the snout assembly 200 and a start of the second region 210*b* of the opening 210 is less than approximately 2.7 millimeters (mm). The distance from the output end of the snout assembly 200 and the start of the second region 210*b* of the opening 210 being reduced (e.g., as compared to the conventional snout assembly 100) improves heat dissipation efficiency between the ferrule 204 and the snout bulkhead 202 by increasing a contact region between the ferrule 204 and the snout bulkhead 202. Notably, in the conventional snout assembly 100 a distance from an output end of the snout bulkhead 104 and a start of a narrow region of the opening in the snout bulkhead 104 is 6.05 mm. In the snout assembly 200, the distance between the output end of the snout assembly 200 and the start of the second region 210*b* of the opening may be, for example, approximately 1.49 mm (e.g., a reduction of approximately 4.56 mm).

The ferrule 204 is a component that protects the optical fiber from bonding with the snout bulkhead 202. In some implementations, the ferrule 204 may comprise a ceramic material, such as alumina. In some implementations, the optical fiber (not shown) is arranged in an opening of the ferrule 204 along the longitudinal axis 212. In some implementations, the ferrule 204 spans a portion of the first region 210*a* of the opening 210 and a portion of the second region 210*b* of the opening 210. In some implementations, a length $L_f$ of the ferrule 204 is in a range from approximately 3.0 mm to approximately 10.0 mm, such as 6.5 mm. In some implementations, a length of a portion of the ferrule 204 that is within the second region 210*b* of the opening 210 is greater than a length of a portion of the ferrule 204 that is within the first region 210*a* of the opening 210. For example, in some implementations, at least approximately 80% of the length $L_f$ of the ferrule 204 is within the second region 210*b* of the opening 210. In some implementations, a larger portion of the ferrule 204 being within the second region 210*b* of the opening 210 (e.g., as compared to the conventional snout assembly 100) provides improved heat dissipation efficiency and hermeticity (e.g., as compared to the conventional snout assembly 100). In some implementations, within the second region 210*b* of the opening 210, a distance between an outer surface of the ferrule 204 (e.g., a surface of the metallization layer 206 on the outer surface of the ferrule 204) and a surface of the second region 210*b* of the opening 210 is in a range from approximately 10% to approximately 20% of a diameter of the ferrule 204.

Figure 2C:
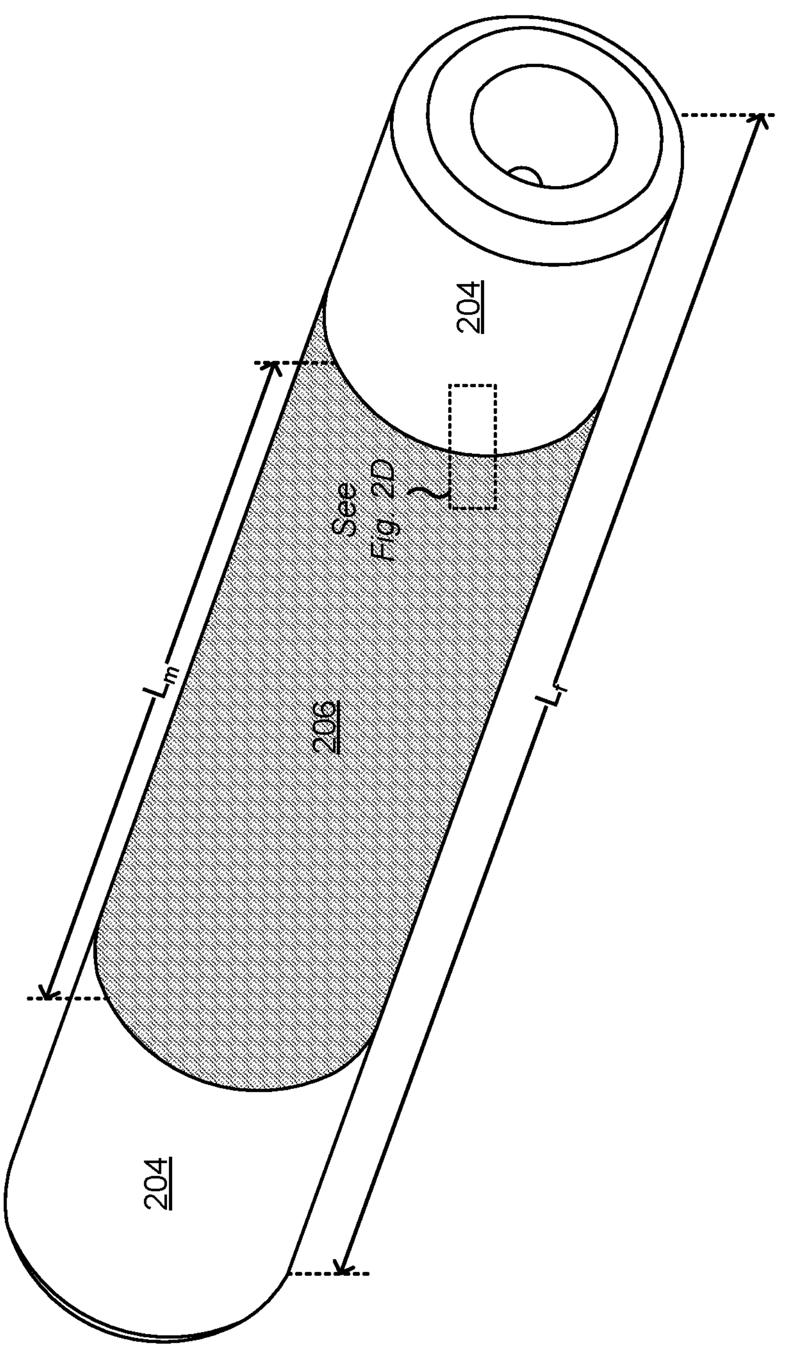
Figure 2D:
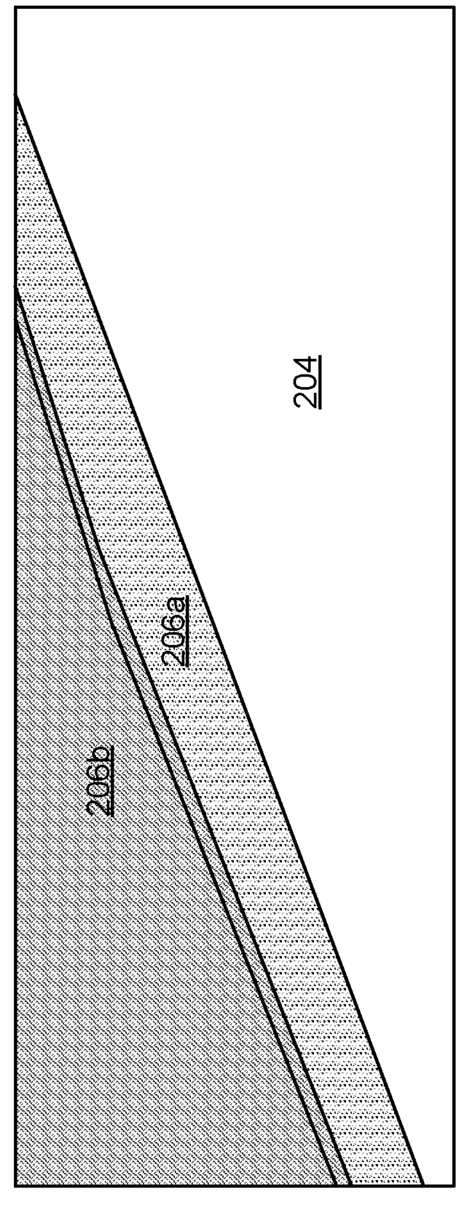

The metallization layer 206 comprises one or more layers to enable bonding of the ferrule 204 and the CuAg solder material 208 in association with providing a hermetic seal for the snout assembly 200. In some implementations, the metallization layer 206 is present on a portion of an outer surface of the ferrule 204. FIG. 2C is a diagram illustrating an example implementation of the metallization layer 206 on an outer surface of the ferrule 204. In some implementations, as illustrated in FIG. 2C, the metallization layer 206 surrounds a circumference of the ferrule 204.

In some implementations, a thickness of the metallization layer 206 is in a range from approximately 2 micrometers (μm) to approximately 5 μm. In some implementations, the ferrule 204 comprises a ceramic material, as noted above. Bonding the CuAg solder material 208 directly to the ceramic material of the ferrule 204 is difficult. One reason for the difficulty in bonding the CuAg solder material 208 directly to the ferrule 204 is a mismatch in thermal expansion between the ferrule 204 and the CuAg solder material 208. Ceramic materials generally have a different CTE than metallic materials such as Cu or Ag. Thus, when a joint is heated or cooled, the CTE mismatch can cause stress at a bonding interface, which leads to poor bonding or even cracking. Another reason for the challenge of bonding the CuAg solder material 208 directly to the ferrule 204 is wetting issues—for a solder to bond well with a substrate, the solder must "wet" a surface of the substrate. Here, wetting refers to the ability of the liquid solder to spread on the substrate to form a good bond. However, the ceramic material of the ferrule 204 may have a surface that is not easily wetted by a metallic solder such as the CuAg solder material 208 due to chemical and physical properties of the CuAg solder material 208, which results in poor adhesion. Another reason for the challenge of bonding the CuAg solder material 208 directly to the ferrule 204 is oxide layer formation-ceramic materials are stable oxides by nature, and surface oxide layers on metallic materials such as a copper can hinder the bonding process. The presence of these surface oxides layers can prevent direct metal-to-metal contact between the CuAg solder material 208 and the ceramic material of the ferrule 204, which impairs the formation of a strong bond. Another reason for the challenge of bonding the CuAg solder material 208 directly to the ferrule 204 is chemical incompatibility—the chemical properties of the ceramic material of the ferrule 204 and the CuAg solder material 208 may not be sufficiently compatible to form a good bond. For a metallic material to bond well with a ceramic material, an intermediate layer or a specific type of solder material that can chemically react or have affinity with both the ceramic material and the metallic material is needed. In some implementations, a metallization layer 206 with a thickness in a range from approximately 2 μm to approximately 5 μm can be applied to the ceramic surface of the ferrule 204 to create a bondable surface for the CuAg solder material 208 so as to overcome these difficulties.

In some implementations, a length $L_m$ of the metallization layer 206 is less than 50% of a length of the ferrule 204. For example, the length $L_f$ of the ferrule 204 may be approximately 6.5 mm, and the length $L_m$ of the metallization layer 206 may be in a range from approximately 2.5 mm to approximately 3.0 mm. In some implementations, the length $L_m$ of the metallization layer 206 is less than approximately 70% of a length of the second region 210*b* of the opening 210. In some implementations, the length of the metallization layer 206 being less than approximately 70% of the length of the second region 210*b* of the opening 210 facilitates a brazing process by providing an achievable flow distance for the CuAg solder material 208. In some implementations, the metallization layer 206 extends beyond the CuAg solder material 208 near an end of the ferrule 204 nearer to the output end of the snout assembly 200 (e.g., a distance between an edge of the metallization layer 206 the output end of the snout assembly 200 is less than a distance between an end of the CuAg solder material 208 and the output end of the snout assembly 200). In some implementations, a distance along the length $L_f$ of the ferrule 204 from an edge of the metallization layer 206 to an end of the second region 210*b* of the opening 210 is in a range from approximately 0.5 mm to approximately 1.5 mm. For example, with reference to FIG. 2B, the metallization layer 206 may start approximately 0.5 mm to approximately 1.5 mm inside of the second region 210*b* of the opening 210, in some implementations. In some implementations, a distance that is greater than or equal to approximately 0.5 mm improves manufacturability of the snout assembly 200 (e.g., a distance of less than 0.5 mm is difficult to reliably provide during manufacture of the snout assembly 200). In some implementations, a distance that is less than or equal to approximately 1.5 mm improves heat distribution efficiency along the ferrule 204 (e.g., a distance greater than 1.5 mm would reduce heat dissipation efficiency due to the ceramic material of the ferrule 204 having poorer heat conduction as compared to a metallic material).

In some implementations, the metallization layer 206 may include multiple layers. For example, with reference to FIG. 2D, the metallization layer 206 may in some implementations include a transition layer 206*a* on the surface of the ferrule 204 and a braze interface layer 206*b* on the transition layer 206*a*. In some implementations, a coefficient of thermal expansion (CTE) of a material of the metallization layer 206 is between a CTE of the ferrule 204 and a CTE of the CuAg solder material 208. That is, in some implementations, a CTE of at least one material of the metallization layer 206 (e.g., a material of the transition layer 206*a* and/or a CTE of the braze interface layer 206*b*) is between the CTE of the ferrule 204 and the CTE of the CuAg solder material 208. In some implementations, the metallization layer 206 transitions from a material with a lower CTE nearer to the ferrule 204 to a material with a higher CTE nearer to the CuAg solder material 208 CuAg solder material. That is, a CTE of a material of the metallization layer 206 closer to the surface of the ferrule 204 may be lower than a CTE of a material of the metallization layer 206 further from the surface of the ferrule 204. Put another way, the metallization layer 206 in some implementations has a transition in CTE within the metallization layer 206 itself (e.g., that CTEs each layer of the metallization layer 206 provide a transition from the CTE of the ferrule 204 to the CTE of the CuAg solder material 208). Additional details regarding characteristics and purpose of the metallization layer 206 are provided below.

The CuAg solder material 208 is a material that is to provide a hermetic seal between the snout bulkhead 202 and the ferrule 204. That is, the CuAg solder material 208 may serve to hermetically bond the metallized ferrule 204 (e.g., the ferrule 204 with the metallization layer 206) and the snout bulkhead 202 together. In some implementations, the CuAg solder material 208 is present along at least 60% of the length $L_b$ of the second region 210*b* of the opening 210. In some implementations, the CuAg solder material 208 being present along at least 60% of the length $L_b$ of the second region 210*b* of the opening 210 improves manufacturability of the snout assembly 200 by controlling a distance that the CuAg solder material 208 needs to flow within the relatively small gap between the ferrule 204/metallization layer 206 and the snout bulkhead 202 (e.g., as compared to requiring the CuAg solder material 208 to be present along more than 60% of the length $L_b$, which may be difficult to manufacture). In some implementations, the CuAg solder material 208 is to provide a hermetic seal over a wide temperature range, such as a temperature range from approximately-50 degrees Celsius (° C.) to approximately 120° C. In some implementations, the CuAg solder material 208 is a material that is to provide a hermetic seal over a pressure range from vacuum to approximately 2 atmospheres (atm). Thus, the CuAg solder material 208 in some implementations enables operation of the snout assembly 200 in a harsh working environment, such as outer space.

As noted above, the metallization layer 206 may provide a transition in CTE from a CTE of the ferrule 204 and a CTE of the CuAg solder material 208. In some implementations, to provide such a transition, a CTE of the metallization layer 206 (e.g., a CTE of each layer of the metallization layer 206) is between a CTE of a material of the ferrule 204 and a CTE of the CuAg solder material 208.

As described above, the conventional snout assembly 100 uses a glass solder to bond the ferrule 102 and the snout bulkhead 104 together. Thermal conductivity of glass solder is significantly lower than that of CuAg solder, meaning that heat transfer through CuAg solder is more efficient and provides improved heat dissipation. One challenge in using CuAg solder is that CuAg solder cannot braze ceramics and steel together. The brazing process therefore makes control of hermeticity between a ferrule and CuAg solder challenging because CuAg solder has significantly higher melting temperature and higher CTE than glass solder. For example, solder material has to reach a melting point of the solder material in order to start soldering. A solder material with a higher melting point can therefore cause a temperature of materials around the solder material to increase. Therefore, amount of mismatch in thermal expansion/shrinkage among adjacent materials is higher after cooling. Thus, a solder material with a higher melting temperature could have a larger thermal expansion difference with respect to other materials used in a snout assembly, which could increase a likelihood of gaps or stress concentration between the solder material and other components of the snout assembly (e.g., a ferrule or a snout bulkhead). Here, the use of the metallization layer 206 as a transitional material (e.g., with the metallization layer 206 having a CTE that is between a CTE of the ferrule 204 and a CTE of the CuAg solder material 208) resolves this issue. Specifically, the metallization layer 206 (e.g., comprising a transition layer 206*a* and a braze interface layer 206*b*) is brazed on the surface of the ferrule 204 prior to application of the CuAg solder material 208. In this way, effective brazing can be performed on the metallization area of the ferrule 204 (i.e., the area of the ferrule 204 on which the metallization layer 206 is present) using CuAg solder material, thereby enabling a hermetic seal. In some implementations, as noted above, a distance (e.g., a gap) between the ferrule 204 (including the metallization layer 206) to a surface of the second region 210*b* of the opening 210 may be in a range from approximately 10% to approximately 20% of a diameter of the ferrule 204 (e.g., to enable the CuAg solder material 208 to flow into the gap between the metallization layer 206 and the snout bulkhead 202). A gap smaller than approximately 10% of the diameter of the ferrule 204 would provide the following difficulties with respect to the CuAg solder material 208: (1) capillary action limitation-brazing relies on capillary action to draw molten CuAg solder material 208 into the gap; if the gap is less than approximately 10% of the diameter of the ferrule 204, then capillary action may be insufficient to effectively draw the molten CuAg solder material 208 into the gap, thereby resulting in incomplete filling, and (2) difficulty in achieving uniform heating-uniform heating of a joint is essential for a quality brazed connection; a gap that is less than approximately 10% of the diameter of the ferrule 204 would make ensuring that the entire joint is heated evenly difficult, which can result in poor flow of the CuAg solder material 208 or incomplete filling of the gap. Additionally, a gap larger than approximately 20% of the diameter of the ferrule 204 would reduce effectiveness of the hermetical seal provided in the snout assembly 200.

In this way, the metallization layer 206 and the CuAg solder material 208 of the snout assembly 200 may serve to bond the ferrule 204 and the snout bulkhead 202 so as to provide a hermetic seal, thereby increasing reliability of a high-power laser pump module operating in an environment a significant temperature-variation (e.g., outer space) by preventing fiber burn. More particularly, the CuAg solder material 208 of the snout assembly 200 provides improved heat dissipation (e.g., as compared to the glass solder material 106 in the conventional snout assembly 100), thereby preventing fiber burn while also providing a hermetic seal as enabled by the presence of the metallization layer 206.

In one particular example embodiment, results of a finite element analysis reveal that thermal resistance and heat accumulation of the conventional snout assembly 100 are significantly higher than those of the snout assembly 200. Results of the FEA are shown in Table 1 below. As shown, heat accumulation and heat transfer efficiency of the snout assembly 200 improve by 47% and 54%, respectively. As a result a likelihood failure of a high-power laser pump module is reduced or eliminated.

TABLE 1

| Snout Assembly Design | Thermal Resistance (° C./W) | Max. Temp. (° C.) |
|---|---|---|
| Snout assembly 100 | 20.241 | 163.69 |
| Snout assembly 200 | 9.261 | 86.83 |

As indicated above, FIGS. 2A-2D are provided as examples. Other examples may differ from what is described with regard to FIGS. 2A-2D. For example, while the brazing material used in the snout assembly 200 is described as the CuAg solder material 208, the use of one or more other brazing materials is possible. For example, the snout assembly 200 may in some implementations comprise a gold-tin (AuSn) solder material or another solder material with a suitable melting temperature and CTE. In some implementations, the selection of the brazing material may depend on or may itself define a design of another component of the snout assembly 200, such as a design of the metallization layer 206.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A snout assembly of a laser pump module, comprising:

a snout bulkhead comprising an opening along a longitudinal axis of the snout bulkhead;

a ferrule in the opening of the snout bulkhead;

a metallization layer on a portion of an outer surface of the ferrule; and a copper-silver (CuAg) solder material between the metallization layer and a surface of the opening, wherein the CuAg solder material bonds the ferrule and the snout bulkhead.

2. The snout assembly of claim 1, wherein the opening in the snout bulkhead comprises a first region and a second region and the ferrule spans a portion of the first region and a portion of the second region.

3. The snout assembly of claim 2, wherein a length of the second region is at least two times larger than a length of the first region.

4. The snout assembly of claim 2, wherein, within the second region of the opening, a distance between an outer surface of the ferrule and a surface of the opening is in a range from approximately 10% to approximately 20% of a diameter of the ferrule.

5. The snout assembly of claim 2, wherein at least approximately 80% of a length of the ferrule is within the second region of the opening.

6. The snout assembly of claim 1, wherein the metallization layer surrounds a circumference of the ferrule.

7. The snout assembly of claim 1, wherein a thickness of the metallization layer is in a range from approximately 2 micrometers (μm) to approximately 5 μm.

8. The snout assembly of claim 1, wherein a length of the metallization layer is less than 50% of a length of the ferrule.

9. The snout assembly of claim 1, wherein a length of the metallization layer is less than 70% of a length of a region of the opening.

10. The snout assembly of claim 1, wherein a distance along a length of the ferrule from an edge of the metallization layer to an end of a region of the opening is in a range from approximately 0.5 millimeters (mm) to approximately 1.5 mm.

11. The snout assembly of claim 1, wherein a coefficient of thermal expansion (CTE) of a material of the metallization layer is between a CTE of the ferrule and a CTE of the CuAg solder material.

12. The snout assembly of claim 1, wherein the metallization layer transitions from a material with a lower CTE nearer to the ferrule to a material with a higher CTE nearer to the CuAg solder material.

13. The snout assembly of claim 1, wherein the metallization layer comprises a transition layer on the ferrule and a braze interface layer on the transition layer.

14. The snout assembly of claim 1, wherein the CuAg solder material is present along at least 60% of a length of a region of the opening.

15. The snout assembly of claim 1, wherein the metallization layer extends beyond the CuAg solder material near an end of the ferrule.

16. The snout assembly of claim 1, wherein the CuAg solder material provides a hermetic seal between the snout bulkhead and the ferrule.

17. The snout assembly of claim 16, wherein the CuAg solder material provides the hermetic seal over a temperature range from approximately-50 degrees Celsius (C) to approximately 120° C.

18. The snout assembly of claim 16, wherein the CuAg solder material provides the hermetic seal over a pressure range from vacuum to approximately 2 atmospheres (atm).

19. A snout assembly, comprising:

a snout bulkhead comprising an opening along a longitudinal axis of the snout bulkhead, wherein the opening in the snout bulkhead comprises a first region and a second region;

a ferrule in the opening of the snout bulkhead, wherein the ferrule spans a portion of the first region and a portion of the second region;

a metallization layer on a portion of an outer surface of the ferrule; and a copper-silver (CuAg) solder material between the metallization layer and a surface of the opening, wherein the CuAg solder material provides a hermetic seal between the snout bulkhead and the ferrule.

20. A snout assembly of a laser pump module, comprising:

a snout bulkhead comprising an opening;

a ferrule in the opening of the snout bulkhead;

a metallization layer on an outer surface of the ferrule; and a copper-silver (CuAg) solder material that bonds the ferrule and the snout bulkhead, wherein a coefficient of thermal expansion (CTE) of the metallization layer transitions from a lower CTE nearer to the ferrule to a higher CTE nearer to the CuAg solder material.

* * * * *